(12) United States Patent
Ito et al.

(10) Patent No.: US 12,146,513 B2
(45) Date of Patent: *Nov. 19, 2024

(54) AXLE RECEIVING ARRANGEMENT FOR AN AIR VENT ROTARY DRIVE AND AIR VENT ROTARY DRIVE

(71) Applicant: Siemens Schweiz AG, Zürich (CH)

(72) Inventors: Hideki Ito, Walchwil (CH); Christian Grossenbacher, Waltenschwil (CH)

(73) Assignee: SIEMENS SCHWEIZ AG, Zurich (CH)

(*) Notice: Subject to any disclaimer, the term of this patent is extended or adjusted under 35 U.S.C. 154(b) by 614 days.

This patent is subject to a terminal disclaimer.

(21) Appl. No.: 17/488,880

(22) Filed: Sep. 29, 2021

(65) Prior Publication Data

US 2022/0106988 A1 Apr. 7, 2022

(30) Foreign Application Priority Data

Oct. 1, 2020 (EP) ..................................... 20199507

(51) Int. Cl.
*F16B 2/06* (2006.01)
*F24F 13/10* (2006.01)

(52) U.S. Cl.
CPC .............. *F16B 2/065* (2013.01); *F24F 13/10* (2013.01); *Y10S 403/09* (2013.01)

(58) Field of Classification Search
CPC .. F16D 1/0847; F16D 1/087; Y10T 403/7188; Y10S 403/09
See application file for complete search history.

(56) References Cited

U.S. PATENT DOCUMENTS

| 98,656 A | * | 1/1870 | Adt | ......................... B25B 1/125 |
| | | | | 269/180 |
| 311,996 A | | 2/1885 | Markham | |

(Continued)

FOREIGN PATENT DOCUMENTS

| CH | 692 711 | 9/2002 | ............... F16D 1/06 |
| CH | 692711 A5 | 9/2002 | ............... F16B 2/06 |

(Continued)

OTHER PUBLICATIONS

U.S. Non-Final Office Action, U.S. Appl. No. 17/488,530, 26 pages, Jun. 13, 2024.

*Primary Examiner* — Matthew R McMahon
(74) *Attorney, Agent, or Firm* — Slayden Grubert Beard PLLC

(57) ABSTRACT

Various embodiments of the teachings herein include an axle receiving arrangement with components that can move in opposite directions and in each case move in the direction of an axle that is received by the arrangement. These components can be part of a tensioning side or a compressing side of the arrangement. The arrangement has at least two components that can be combined with one another and one of said components is in contact with the axle surface participates in a positive-locking and non-positive locking fixing of the axle by the axle receiving arrangement and the other of said components ensures the movability in the direction of the axle. The components in the combined state enclose a gap between on the one hand convex and on the other hand concave curved surfaces.

7 Claims, 8 Drawing Sheets

(56) References Cited

U.S. PATENT DOCUMENTS

| | | | | |
|---|---|---|---|---|
| 2,428,688 A * | 10/1947 | Stischer | ............ | B23B 31/16045 |
| | | | | 279/67 |
| 4,354,399 A * | 10/1982 | Katayama | .............. | B62K 21/18 |
| | | | | 403/373 |
| 5,544,970 A * | 8/1996 | Studer | ................... | F16D 1/0847 |
| | | | | 403/384 |
| 6,126,122 A * | 10/2000 | Ismert | ...................... | F16L 3/243 |
| | | | | 24/271 |
| 6,491,402 B1 * | 12/2002 | Stenzel | ................. | B60R 1/0605 |
| | | | | 359/872 |
| 6,505,991 B2 | 1/2003 | Roman | ......................... | 403/399 |
| 7,073,755 B2 * | 7/2006 | Michaud | ................. | F16B 2/065 |
| | | | | 248/74.1 |
| 7,377,472 B2 * | 5/2008 | Brown | ...................... | F16L 3/10 |
| | | | | 24/271 |
| 8,287,207 B2 * | 10/2012 | Bakken | ................... | F16D 13/10 |
| | | | | 403/374.3 |
| 8,353,143 B2 * | 1/2013 | Osborn | ............... | F24F 13/0254 |
| | | | | 52/703 |
| 8,562,238 B2 * | 10/2013 | Hasei | ..................... | B62K 21/16 |
| | | | | 403/396 |
| 10,369,931 B2 * | 8/2019 | Ferman | ................... | B60R 1/078 |
| 10,738,808 B2 * | 8/2020 | Pryor | .................. | A61M 5/1415 |
| 2009/0005282 A1 | 1/2009 | Grzyll | ........................... | 510/161 |
| 2009/0052982 A1 | 2/2009 | Bakken | ........................ | 403/261 |
| 2018/0073528 A1 * | 3/2018 | Pryor | ...................... | F16B 2/065 |
| 2022/0106987 A1 | 4/2022 | Ito et al. | | |
| 2022/0106988 A1 | 4/2022 | Ito et al. | | |

FOREIGN PATENT DOCUMENTS

| | | | | |
|---|---|---|---|---|
| CN | 109138706 A | 1/2019 | ............. | E05F 15/40 |
| CN | 110645250 A | 1/2020 | ............. | F16B 33/00 |
| CN | 211193587 U | 8/2020 | ............. | B23Q 3/00 |
| CN | 211332227 U | 8/2020 | ............. | B23Q 3/06 |
| CN | 114278781 A | 4/2022 | ............. | F16K 31/04 |
| CN | 114278782 A | 4/2022 | ............. | F16K 31/04 |
| DE | 195 16 425 | 11/1995 | ............... | F16C 3/02 |
| DE | 102013000850 A1 | 7/2014 | ............... | F16D 1/06 |
| GB | 2395248 A | 5/2004 | ............... | B62D 1/20 |

* cited by examiner

AXLE RECEIVING ARRANGEMENT FOR AN AIR VENT ROTARY DRIVE AND AIR VENT ROTARY DRIVE

CROSS-REFERENCE TO RELATED APPLICATIONS

This application claims priority to EP Application No. 20199507.3 filed Oct. 1, 2020, the contents of which are hereby incorporated by reference in their entirety.

TECHNICAL FIELD

The present disclosure relates in the broadest sense to an adjusting drive facility. Various embodiments of the teachings herein include adjusting drive facilities for an air vent or the like in a system for heating, ventilation, or cooling in a building (air vent rotary drive).

BACKGROUND

An air vent rotary drive comprises a drive facility, usually an electric motor, means for non-positive locking and positive-locking contact of an axle of an air vent (axle receiving arrangement) and also optionally a transmission between the drive facility and the axle receiving arrangement. Axle receiving arrangements are described, for example in U.S. Pat. No. 6,505,991. The applicant offers a dedicated axle receiving arrangement under the product designation GS MK2.

The axle receiving arrangement of an air vent rotary drive—particularly in the case of a round axle of the air vent—is a non-positive locking and positive-locking contact of the air vent axle, which is on the one hand loadable and on the other hand sufficiently mechanically secure for the transmission of the torque.

SUMMARY

The teachings of the present disclosure describe axle receiving arrangements by means of which a particularly loadable non-positive and positive-locking fixing to an axle is possible. For example, some embodiments of the teachings herein include an axle receiving arrangement (10) for fixing to an axle (30), said axle receiving arrangement comprising components (12, 14, 16) that can move in opposite directions and in each case move in the direction of an axle (30) that is received by the axle receiving arrangement (10), wherein the components (12, 14, 16) that can move in opposite directions are part of a tensioning side or compressing side of the axle receiving arrangement (10), wherein the axle receiving arrangement (10) has at least two components (14, 16) that can be combined with one another on the tensioning side and/or on the compressing side and in the case of fixing the axle receiving arrangement (10) to the axle (30) one of said components participates in a positive-locking and non-positive locking fixing of the axle (30) by means of the axle receiving arrangement (10) and the other of said components ensures the movability in the direction of an axle (30) that is received by the axle receiving arrangement (10), and wherein the tensioning-side or compressing-side components (14, 16) that can be combined with one another enclose a gap (46) in the combined state.

In some embodiments, the components (14, 16) that can be combined with one another and that enclose the gap (46) have mutually facing convex and concave surfaces (42, 44), namely one of the components (14) has a convex underside (42) and the other component (16) has a concave upper side (44), and the component (14) that lies against the axle surface in the case of the positive-locking and non-positive locking fixing of the axle (30) has the convex underside (42) that faces the other component (16).

In some embodiments, the component (14) that lies against the axle surface in the case of the positive-locking and non-positive locking fixing of the axle (30) has a V-shaped contact surface (34), and in the case of fixing an axle (30), on the one hand contact sites of the V-shaped contact surface (34) result on the axle surface and also on the other hand contact sites result between the convex underside of the component (14) that lies against the axle surface and the concave upper side of the other component (16), and a gap between the contact sites on the V-shaped contact surface (34) is smaller than a gap between in each case an inner end of the contact sites of the mutually facing convex and concave surfaces (42, 44).

In some embodiments, the opening width of an angle between two tangents, namely two tangents that are applied in the region of the edge points of the convex underside (42) of the component (14) that lies against the axle surface, is smaller than the opening width of an angle between two tangents that follow the V-shaped contact surface (34).

In some embodiments, said axle receiving arrangement comprises as components a tension bracket (12), a pressure bracket (14), a bolt (16), a nut (18) and a housing (20), wherein the tension bracket (12), pressure bracket (14), bolt (16) and nut (18) are inserted into the housing (20) in a configuration in which said tension bracket, pressure bracket, bolt and nut are combined with one another and are fixed in the housing (20), wherein the pressure bracket (14) and the bolt (16) function as compressing-side components (14, 16) that can be combined with one another and that in the combined state enclose a gap (46) and wherein the pressure bracket (14) lies with a pressure bracket contact surface (34) against the axle surface in the case of fixing an axle (30) by means of the axle receiving arrangement (10).

In some embodiments, the bolt (16) has a concave bolt upper side (44) and the pressure bracket (14) has a convex pressure bracket underside (42), and the bolt (16) with its concave bolt upper side (44) receives the pressure bracket (14) with its convex pressure bracket underside (42), and the gap (46) remains between the bolt upper side (44) and the pressure bracket underside (42) and in the combined state said gap is enclosed by the pressure bracket (14) and bolt (16).

In some embodiments, in the case of fixing an axle (30), on the one hand contact sites of the V-shaped pressure bracket contact surface (34) result on the axle surface and also on the other hand contact sites result between the convex pressure bracket underside (42) and the concave bolt upper side (44), and a gap between the contact sites on the pressure bracket contact surface (34) is smaller than a gap between in each case an inner end of the contact sites of the pressure bracket underside (42) and the bolt upper side (44).

In some embodiments, the opening width of an angle between two tangents that are applied in the region of the edge points of the pressure bracket underside (42) is smaller than the opening width of an angle between two tangents that follow the V-shaped pressure bracket contact surface (34).

In some embodiments, said axle receiving arrangement has a tension bracket (12) as a movable component on the tensioning side, wherein for the movability of the tension bracket (12) a thread of the tension bracket (12) is in engagement with a thread of a nut (18), wherein the tension bracket (12) has the thread in a tension bracket upper part (12') and the thread starts in said tension bracket upper part on an underside of the tension bracket upper part (12') and terminates below an upper side of the tension bracket upper part (12'), and wherein owing to the thread that terminates below the upper side of the tension bracket upper part (12') a circumferential annular gap (50) remains on the upper side of the tension bracket upper part (12').

As another example, some embodiments include an air vent rotary drive having an axle receiving arrangement (10) as claimed in one of the preceding claims.

BRIEF DESCRIPTION OF THE DRAWINGS

An exemplary embodiment of the teachings herein is explained below with reference to the drawings. Objects or elements that correspond to one another are provided with the same reference characters in all the figures. In the drawings.

DETAILED DESCRIPTION

Figure 1:
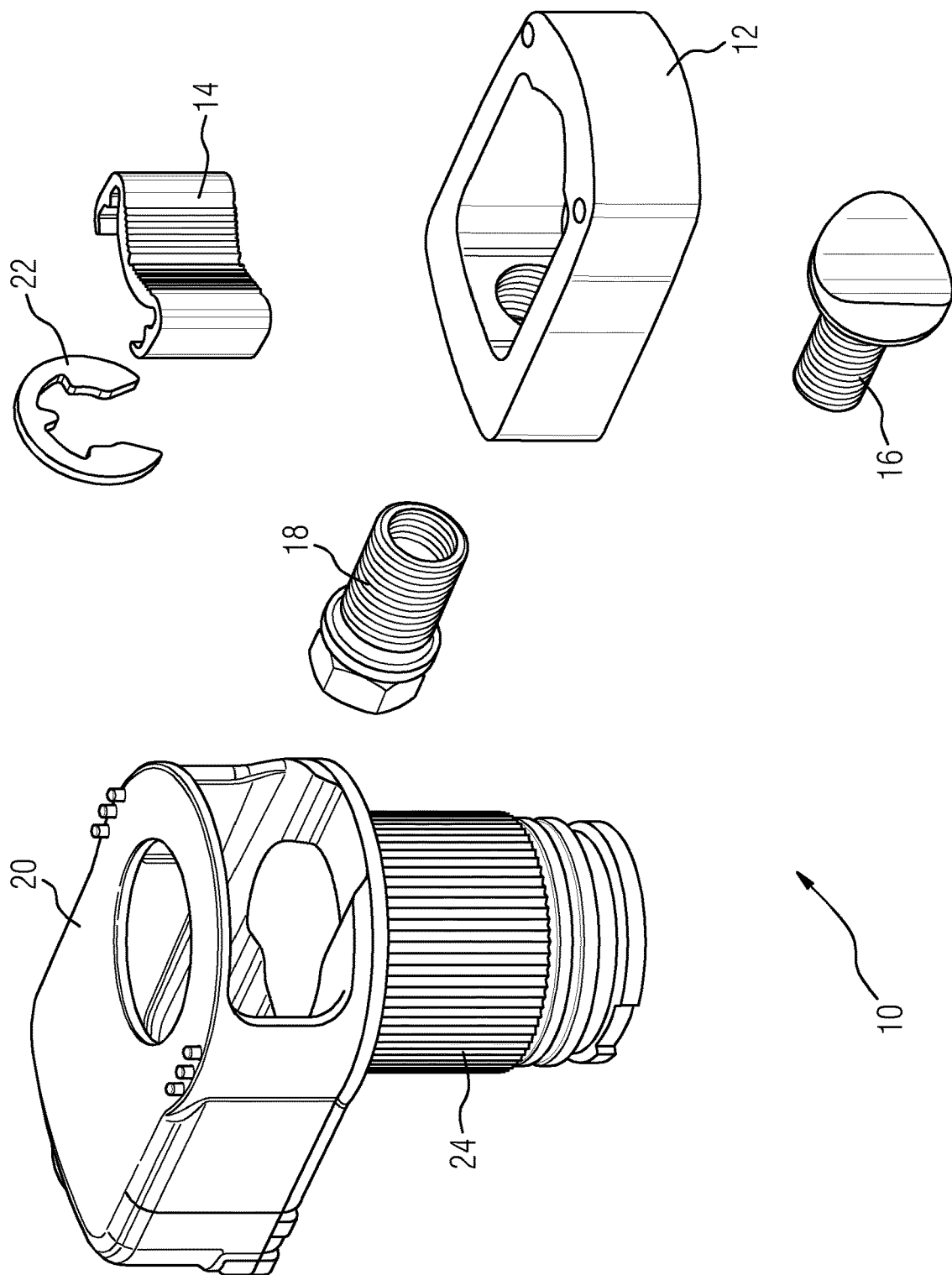
FIG. 1 shows an axle receiving arrangement incorporating teachings of the present disclosure in an exploded view.

In the scope of this disclosure, an axle receiving arrangement is defined and configured for fixing to an axle of an air vent or the like, namely an apparatus in a system for heating, ventilation or cooling in a building. In order to fix to an axle, the axle receiving arrangement comprises components that can move in opposite directions. These components can move in opposite directions in that they can move in opposite directions in each case in the direction of an axle that is received by the axle receiving arrangement, in other words in opposite directions in each case in the direction of the particular axle to which the axle receiving arrangement is to be fixed. In order to differentiate, the components that can move in opposite directions are referred to as tensioning-side components and as compressing-side components. The one or each tensioning-side component can move in a first direction in the direction of the axle surface. The one or each compressing-side component can move in a second direction, which is opposite the first direction, in the direction of the axle surface. The inversely movable components are in other words either part of the compressing side of the axle receiving arrangement or are part of the tensioning side of the axle receiving arrangement.

In some embodiments, the axle receiving arrangement comprises at least two components that can be combined with one another on the tensioning side or on the compressing side or on the tensioning side and on the compressing side. The axle receiving arrangement is provided in other words on the tensioning side and/or compressing side in an at least two-part manner. One of the at least two components comes into contact with the axle surface in the case of fixing an axle. This is referred to as an axle-near component. A further of the at least two components ensures the movability in the direction of the axle that is received by the axle receiving arrangement and comes into contact with a surface of the axle-near component in the case of fixing the axle. In order to differentiate from the axle-near component, this component is referred to as an axle-remote component.

A compressing-side two-part arrangement—as is the case in the exemplary embodiment that is described below—in the case of the at least two compressing-side components is two components that are referred to as a bolt and as a pressure bracket. The pressure bracket is the axle-near component and the bolt is the axle-remote component. Of the at least two components that can be combined with one another, one (the axle-remote component, on the compressing side for example the bolt) ensures the movability in the direction of an axle that is received by the axle receiving arrangement, and the other component (axle-near component, on the compressing side for example the pressure bracket) in the case of fixing the axle receiving arrangement to the respective axle participates in a positive-locking and non-positive locking fixing of the axle by means of the axle receiving arrangement. This latter component only participates in this fixing since said component is itself part either of the compressing side or the tensioning side of the axle receiving arrangement and the actual fixing is performed within the scope of a cooperation of the tensioning side and compressing side.

In some embodiments, the (tensioning side or compressing side) at least two components that can be combined with one another (axle-remote component, axle-near component) enclose a gap in the combined state. The gap that is enclosed by the axle-near and the axle-remote component in the combined and load-free state provides an improved load distribution within the axle-near component that may be produced from a sintering material and that lies directly against the axle surface (in the case of the exemplary embodiment that is described below, this is the pressure bracket). Owing to the gap, the axle-near component can deform in an elastic manner in the direction of the axle-remote component. In this case, the clear span of the gap becomes smaller and the gap can also disappear. The elastic deformation causes a tensioning stress and a compression stress in the axle-near component. Owing to the gap, fundamentally critical tensioning stress in particular in the case of a production of the axle-near component from a sintering material is distributed over a large area. The fundamentally rather uncritical compression stress arises essentially at a point at which otherwise a tensioning stress would act, which in the case of exceeding load upper limits leads to a rupture of the component that lies against the axle surface.

In some embodiments, the elastic deformation of the axle-near component provides a resulting positive-locking connection between the surface of the elastic deforming component and the axle surface, said positive-locking connection results in being larger with regard to surface area owing to the elastic deformation arrangement. Even if the enlargement of the surface that participates in the positive-locking connection is only minimal, an improvement of the positive-locking connection and thereby also the non-positive locking connection is assumed.

In some embodiments, the at least one-sided (compressing side and/or tensioning side) two-part arrangement of the components on said sides (axle-near and axle-remote component). In the case of a compressing side two-part arrangement, the at least two components are the bolt as the axle-remote component and the pressure bracket as the axle-near component. The two components can be combined with one another in a detachable manner and are combined in a detachable manner in the operational state of the axle receiving arrangement. This ability to combine in a detachable manner renders it possible when required to exchange the axle-near component, in other words for example the pressure bracket. The axle-near component—as a wearing part—can be exchanged for example if a structuring that is provided on the surface of said axle-near component (referred to further below as a pressure bracket contact surface) deteriorates after multiple uses or long-term use.

In some embodiments, the components that can combine with one another and that enclose the gap—axle-near component, axle-remote component—have mutually facing convex and concave surfaces, namely one of the components has a convex underside and the other component has a concave upper side. In this case, the component that lies against the axle surface in the case of the positive-locking and non-positive locking fixing of the axle, in other words the axle-near component, has the convex underside that faces the other component (axle-remote component). In the case of fixing an axle by means of the axle receiving arrangement, this shaping causes an elastic deformation of the axle-near component, said deformation being defined by the shaping, and thereby the above-described distribution of tensioning stress and compression stress that is described above.

In some embodiments, the component that lies against the axle surface in the case of the positive-locking and non-positive locking fixing of an axle—the axle-near component—has a V-shaped contact surface and in the case of fixing an axle, on the one hand contact sites of the V-shaped contact surface result on the axle surface and also on the other hand contact sites result between the convex underside of the component that lies against the axle surface (convex underside of the axle-near component) and the concave upper side of the other component (concave upper side of the axle-remote component). While a gap between the contact sites on the V-shaped contact surface is smaller than a gap between in each case an inner end of the contact sites of the mutually facing convex and concave surfaces, the result is an extensive distribution of the fundamentally critical tensioning forces in the axle-near component that occur in the case of fixing.

Another condition that leads to such an extensive distribution of the tension forces in the axle-near component can be formulated with the opening widths of the two angles and accordingly in the case of an axle receiving arrangement of the type proposed here may provide that the opening width of an angle between two tangents, namely two tangents that are applied in the region of the edge points of the convex underside of the component that lies against the axle surface (axle-near component), is smaller than the opening width of an angle between two tangents that follow the V-shaped contact surface of the same component (axle-near component), namely tangents that at least lie against the outer edge points of the V-shaped contact surface on this component.

In some embodiments, the axle receiving arrangement has a tension bracket as a movable component on the tensioning side, wherein for the movability of the tension bracket a thread (inner thread) of the tension bracket is in engagement with a thread (outer thread) of a nut. The thread in the tension bracket is referred to below at times in short as the tension bracket thread. The tension bracket has the tension bracket thread in a region that is referred to for the sake of differentiation as the tension bracket upper part and in said tension bracket upper part the tension bracket thread starts on an underside of the tension bracket upper part and ends below an upper side of the tension bracket upper part. Owing to the tension bracket thread that terminates below the upper side of the tension bracket upper part, a circumferential annular gap remains on the upper side of the tension bracket upper part with respect to the adjoining surface of the nut, namely to the adjoining outer thread.

Such an annular gap avoids a concentration of tensioning stresses in the tension bracket upper part in a closely limited region, which is to be expected without the annular gap. The risk of exceeding load tolerances is consequently avoided or is at least clearly reduced. The tension bracket can therefore also be produced from materials that can be loaded to a lesser extent and are more affordable and is for example a sintering material part. The positive-locking and non-positive locking fixing can thereby be achieved in a sufficiently loadable manner by means of a tension bracket that is produced from a comparatively affordable material.

The axle receiving arrangement may be configured for use in an air vent rotary drive and as part of an air vent rotary drive. The axle receiving arrangement is then fixed to an axle of an air vent or the like, in any case to an apparatus in a system for heating, ventilation, or cooling in a building. Owing to the fixing, a drive that the air vent rotary drive comprises acts directly on the fixed axle and causes a rotation of the axle. A respective air vent or the like is then opened or closed or at least brought into another position.

The exemplary embodiments described herein are not a limitation of the scope of the disclosure. On the contrary, additions and modifications are also entirely possible within the scope of the current disclosure, in particular such additions and modifications that are apparent for the person skilled in the art with regard to the solution to the object for example by combination or conversion of individual features or method steps that are described in general or in the specific description part and also that are contained in the claims and/or drawing and that lead owing to combinable features to a new subject matter.

The illustration in FIG. 1 illustrates in an exemplary manner and in an exploded view an example embodiment of an axle receiving arrangement 10 incorporating teachings of the present disclosure. An axle receiving arrangement 10 can also be referred to as an axle fastening or as an axle adapter, or in English as a shaft adapter. Such or similar terms are synonyms. Here and below, the reference axle receiving arrangement 10 is used.

Axle receiving arrangements 10 are defined for fastening to a rotatable axle 30 (FIG. 2), in particular examples to an axle of an air vent or the like in a system for heating, ventilation, or cooling in a building. An axle receiving arrangement 10 that is defined for fastening to such an axle 30 of an air vent or the like is part of an apparatus that functions as an air vent rotary drive or comes into consideration as part of such an apparatus.

As is illustrated in the illustration in FIG. 1, an axle receiving arrangement 10 of the type proposed here comprises multiple parts that are referred to below at times individually or together as a component or components, namely a tension bracket 12, a pressure bracket 14, a V-shaped bolt that is referred to in short below as bolt 16, and a nut 18 (sleeve nut). The nut 18 has on the end side a positive-locking element for the actuation of said nut. A hexagonal head that can be contacted by means of a socket wrench or the like is illustrated here in an exemplary manner as an end-side positive-locking element. The nut 18 furthermore has an outer thread and an inner thread along a shaft section of said nut. A corresponding thread (inner thread; tension bracket thread) of the tension bracket 12 runs on the outer thread of the nut 18. A corresponding thread (outer thread) of the bolt 16 runs in the inner thread of the nut 18. The region of the tension bracket 12 having the inner thread/pressure bracket thread—only for the purpose of differentiation and without reference to a later installation location—is referred to as a tension bracket upper part 12′.

All the components mentioned above (tension bracket 12, pressure bracket 14, bolt 16 and nut 18) in the usable state of the axle receiving arrangement 10 are located in a housing 20 of the axle receiving arrangement 10 and namely in a manner in which the nut (by means of the corresponding thread) on the one hand is in engagement with the tension bracket 12 and on the other hand is in engagement with the bolt 16 and the pressure bracket 14 is attached to the head-side end (to the free end) of the bolt 16. The housing 20 is likewise a component of the axle receiving arrangement 10.

The pressure bracket 14 in the case of the illustrated embodiment is as wide in the axial direction of an axle 30 that is to be fixed by means of the axle receiving arrangement as the housing 20 allows said pressure bracket to be. Owing to this width, a comparatively large surface results that faces in the direction of an axle 30 that is to be fixed and said surface is at least in part effective as a positive-locking surface in the case of fixing an axle 30. This surface is structured for example in the shape of a ribbed/toothed surface having parallel ribs. These ribs extend in the direction of a longitudinal axis of an axle 30 that is to be fixed by means of the axle receiving arrangement (in other words in the direction of the above-mentioned width of the pressure bracket 14). In other words, a comparatively large length of the individual ribs is consequently also provided. These lengths cause an extensive supporting arrangement on the axle surface and an effective force/load distribution.

The housing 20 has a cylindrical extension 24 that is toothed in sections on the outer surface. A rotational movement of a drive (not illustrated) of an air vent rotary drive (likewise not illustrated) or the like is transmitted to the axle receiving arrangement 10 by means of this extension 24 in a manner known per se. This causes a corresponding rotation of the axle 30 and thereby for example the opening of an air vent (likewise not illustrated) or the like in the case of an axle receiving arrangement 10 that is fixed to an axle 30 (FIG. 2).

The tension bracket 12 is for example a sintered metal part. The bolt 16 is for example a metal rotary part and the pressure bracket 14 can be produced from a sintering material. A steel powder nickel alloy is considered for example as a sintering material. The tension bracket 12 may have a similar structuring on a surface that faces in the direction toward an axle 30 that is to be fixed, as has been explained above for the pressure bracket 14, in other words in particular a ribbed/toothed surface having parallel ribs.

The pressure bracket 14 can be deformed in an elastic manner to some extent within the scope of its material properties. A component that is embodied from a sintering material is affordable and comparatively simple to produce even with comparatively complex contours and/or surface structures. As is well known, sintering materials are capable of absorbing compressive stresses comparatively effectively, whereas tensioning stresses are rather critical. Die cast zinc for example comes into consideration as a material of the housing 20, in particular a pressure die casting by means of so-called zamak alloys.

Figure 2:
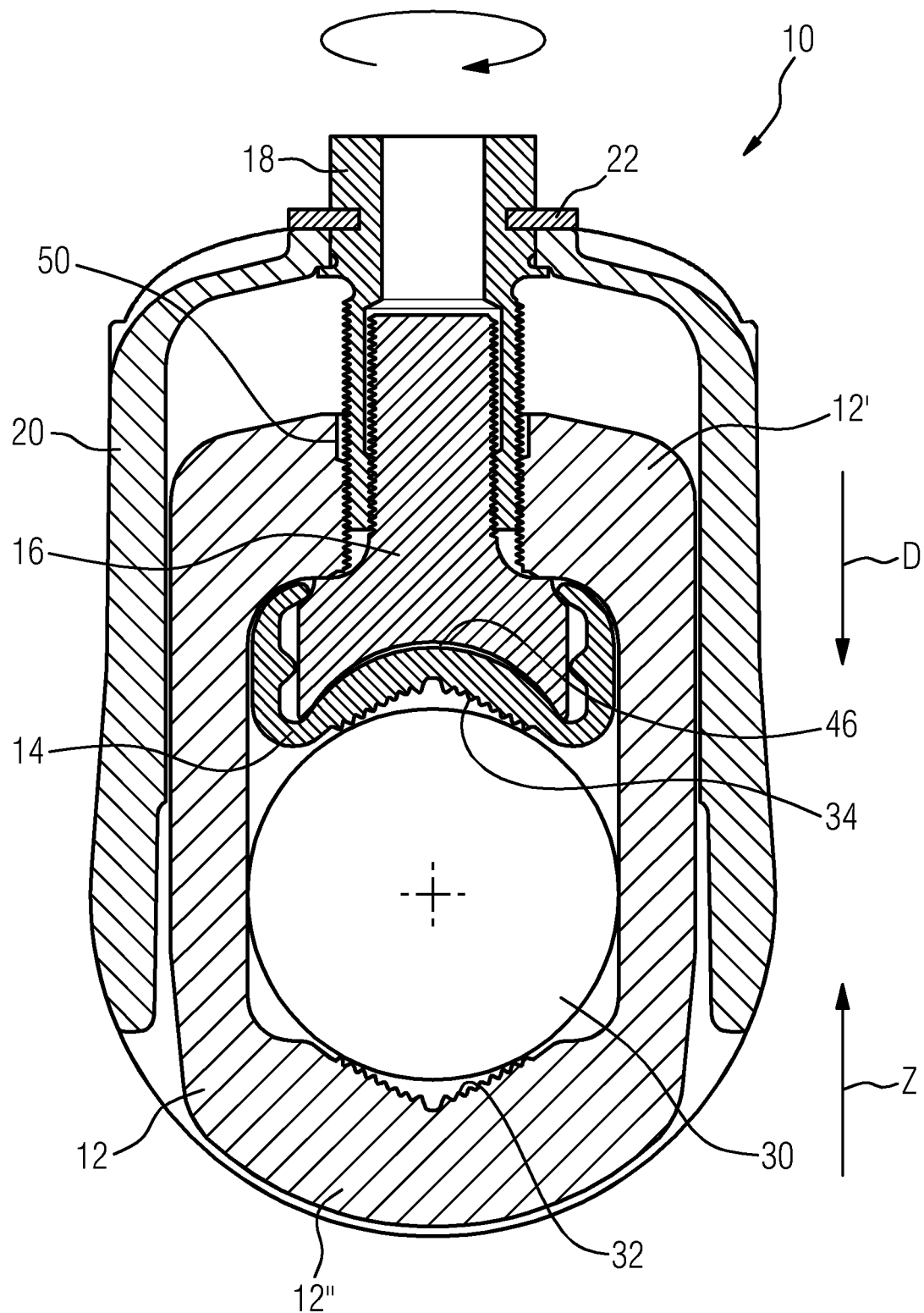
FIG. 2 shows the axle receiving arrangement of FIG. 1 in a sectional view.

The illustration in FIG. 2 illustrates the above-mentioned components (tension bracket 12, pressure bracket 14, bolt 16, nut 18, and housing 20) in the state combined with one another and in a sectional view. The sectional plane extends along a center axis of the nut 18. The housing 20 has corresponding openings for such a receiving arrangement of the tension bracket 12, pressure bracket 14, bolt 16, and nut 18, namely a first opening and it is possible to insert the entirety of these components into the housing 20 through said first opening, and an opposite-lying second opening and the free end of the nut 18 protrudes out the housing 20 through said second opening and there renders it possible to contact the positive-locking element so as to actuate the nut 18. At this location, in the state in which they are combined with one another these components (tension bracket 12, pressure bracket 14, bolt 16, nut 18) are fixed by means of a snap ring (see also FIG. 1) 22 in the housing 20.

The receiving arrangement of these components in the housing 20 causes a rotationally fixed bearing arrangement (bearing arrangement that is secured against twisting in the case of actuating the nut 18) of the tension bracket 12 on the one hand and also the pressure bracket 14 and the bolt 16 on the other hand in each case in the housing 20. The rotationally fixed bearing arrangement is provided in that the housing 20 receives the components in a positive-locking manner or at least in an essentially positive-locking manner. In this respect, reference is made to the illustration in FIG. 1. A dimension that is measured in the direction of the vertical axis of the sheet with this illustration at least of the tension bracket 12 and the pressure bracket 14 corresponds approximately to the width of the opening that is measured in the same direction in the housing 20. In the case of a rotation of the nut 18, the tension bracket 12 and the pressure bracket 14 (and with the pressure bracket 14 the bolt 16) in the housing 20 cannot rotate along with the nut and in lieu of a rotation a translational movement results along the thread of the nut 18.

Owing to the rotationally fixed bearing arrangement, an actuation (rotational movement) of the nut 18 causes a movement in the opposite direction of the tension bracket 12 on the one hand and also the combination of bolt 16 and pressure bracket 14 on the other hand. The tension bracket 12 on the one hand and also the bolt 16 and the pressure bracket 14 on the other hand are accordingly referred to as tensioning-side or compressing-side components of the axle receiving arrangement 10.

The movement in opposite directions is a movement in opposite directions along an axis that is defined by the longitudinal axis of the nut 18. In the case of an actuation of the nut 18—illustrated in the illustration in FIG. 2 by means of the circular arrow above the head-side end of the nut 18—the tension bracket (or the or each tensioning-side component) moves in the direction toward the head-side positive-locking element of the nut 18 and the combination of the pressure bracket 14 and bolt 16 (or the or each compressing-side component) into the opposite direction. These two movements are illustrated in the illustration in FIG. 2 by means of arrows at the side. The arrow that is pointing downward in the illustration illustrates the movement of the pressure bracket 14 and bolt 16. The arrow is referred to by the letter "D" (for pressure bracket). The arrow that is pointing upward in the illustration illustrates the movement of the tension bracket 12 and is referred to by the letter "Z" (for tension bracket).

In some embodiments, the tension bracket 12 has an O-shape and encompasses an opening for an axle 30. In the illustration in FIG. 2 an axle receiving arrangement 10 that is attached to an axle 30 is illustrated and accordingly the axle is located in this opening in the tension bracket 12 and is surrounded by the tension bracket 12 and by the pressure bracket 14. The axle receiving arrangement 10 is fixed to the axle 30 by actuating the nut 18 and the resultant movement in opposite directions of the tensioning-side and compressing-side components. Within the scope of such an actuation of the nut 18, an essentially V-shaped contact surface 32 on the side of the tension bracket 12 and also a likewise essentially V-shaped contact surface 34 on the side of the pressure bracket 14 come into contact with a section of the surface of the axle 30 (axle surface). The essentially V-shaped contact surface 32 on the side of the tension bracket 12 is located on the end of the tension bracket 12 that lies opposite the tension bracket thread in the axial direction. This region of the tension bracket 12—according to the designation of the opposite-lying end as the tension bracket upper part 12' and only for the sake of differentiation, in other words without a reference to a possible later installation location—is referred to as the tension bracket lower part 12". The tension bracket upper part 12' can also be referred to as a tension bracket yoke since this connects the two side sections of the tension bracket 12 to one another. The tension bracket upper part 12' (the tension bracket yoke) and the tension bracket lower part 12" are connected to the in each case adjoining sections of the tension bracket 12 as one piece.

In the case of tightening the nut 18, the contact of the essentially V-shaped contact surface 32 in the region of the tension bracket lower part 12" and also the likewise essentially V-shaped contact surface 34 on the side of the pressure bracket 14 with the axle surface causes a non-positive locking and positive-locking fixing of the axle receiving arrangement 10 on the axle 30. The axle receiving arrangement 10 accordingly has a tensioning side with the tension bracket 12 and the contact surface 32 at said tension bracket and also has a compressing side with the bolt 16 and the pressure bracket 14 and its contact surface 34; the tensioning-side and compressing-side components of the axle receiving arrangement 10 form the tensioning side or compressing side of said axle receiving arrangement.

The two above-mentioned contact surfaces 32, 34 are referred to below for the sake of differentiation as the tension bracket contact surface 32 and the pressure bracket contact surface 34. The two contact surfaces 32, 34 in the case of the illustrated embodiment have the already mentioned toothed/ribbed surface, wherein above-described elevations (ribs) of such a surface structure are oriented in the direction of a longitudinal axis of the axis 30 that is to be received.

The ability of a fixing of the axle receiving arrangement 10 on an axle 30 to withstand a load increases with an as extensive as possible positive-locking connection. The positive-locking surface can fundamentally be enlarged in that the surfaces of the two contact surfaces 32, 34 are adapted to the diameter of an axle 30 that is to be contacted. Crescent-shaped surfaces are then provided in lieu of essentially V-shaped surfaces. It is however only possible by means of crescent-shaped surfaces to grasp an axle 30 having a corresponding diameter by means of the entire surface of the contact surfaces 32, 34. An axle receiving arrangement 10 having such contact surfaces 32, 34 in other words is only suitable for in each case precisely one axle diameter and for other axle diameters contact surfaces 32, 34 having accordingly different crescent-shaped surfaces are required.

Contact surfaces 32, 34 (tensioning-side contact surface, tension bracket contact surface 32; compressing-side contact surface, pressure bracket contact surface 34) having essentially V-shaped surfaces ensure accordingly the useability of one and the same axle receiving arrangement 10 for various axle diameters.

V-shaped contact surfaces 32, 34, in addition to the pressure loading that in the case of fixing an axle receiving arrangement 10 acts on an axle 30 owing to the V-shape, are also exposed to not insignificant tensioning stress, namely a tensioning stress having a force direction that is transverse with respect to the force direction of the pressure loading. Here there is a difference between force effects in the form of a loading, in particular a pressure loading, and a stress, in particular a tensioning stress. A loading is introduced from outside into the respective part (here by the axle surface and the fixing to the axle). The pressure loading leads to an elastic deformation and owing to this deformation—and thereby owing to this underlying pressure loading—a stress results, namely a tensioning stress, in the interior of the part. The tensioning stress is provided owing to the fact that each of the two sides of the respective V-shaped contact surfaces 32, 34 lies against a section of the axle surface. The two surfaces of the respective contact surface 32, 34 that form the V-shape are in this case pushed apart and outward to a certain extent. A tensioning stress is in other words provided starting from the center point of the V-shape and acting in opposite directions. In the event of reaching a load upper limit, this leads to a rupture of the respective component, in other words for example to a rupture of the pressure bracket 14.

Figure 3:
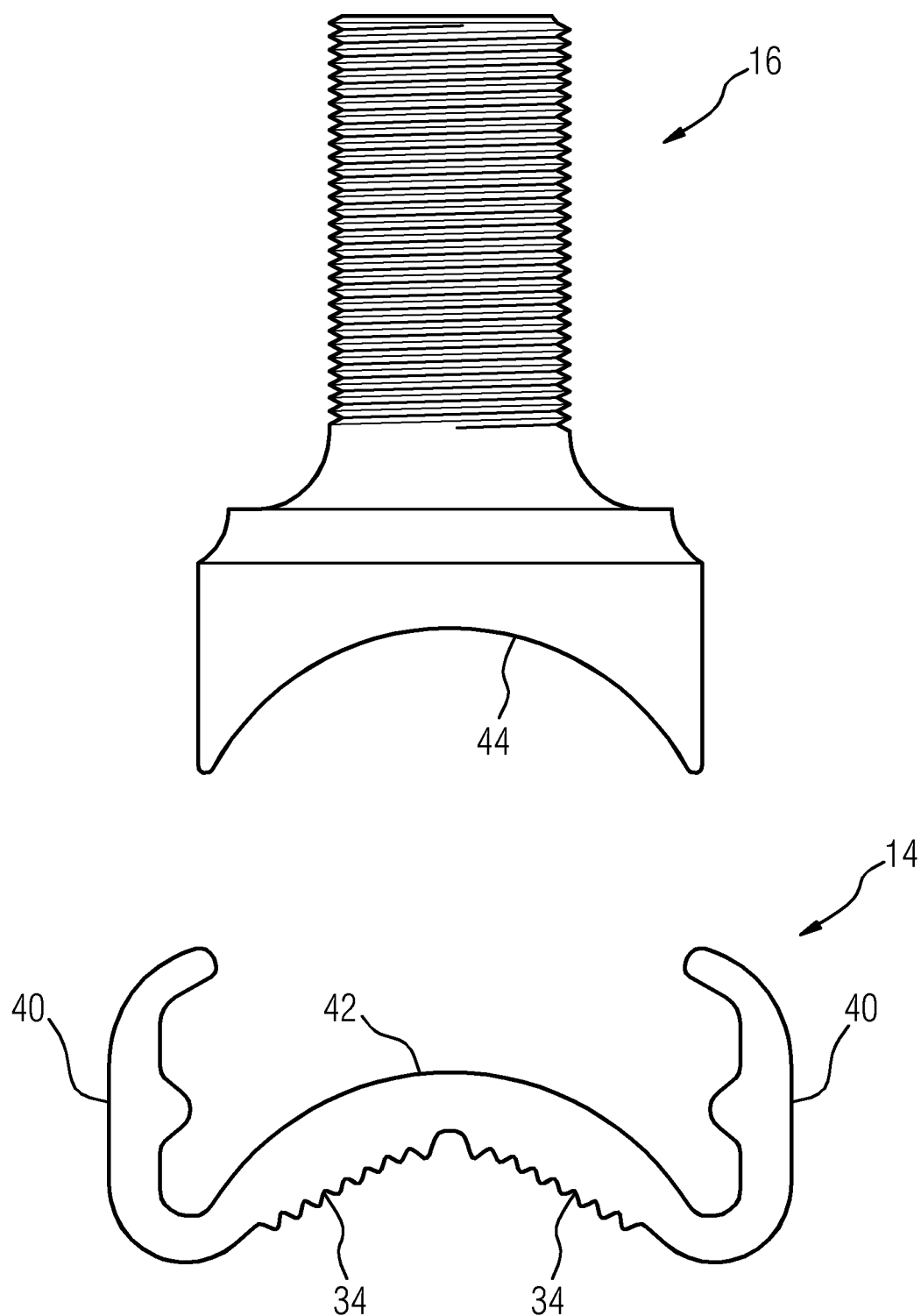
FIG. 3 shows individual components of an axle receiving arrangement from FIG. 1, namely a bolt and a pressure bracket.

In order to reduce such stresses and specifically in order to avoid a rupture of a component, first and foremost at least on one side—tensioning side and/or compressing side—at least one two-part arrangement of the components of the axle receiving arrangement 10 is provided and said components are moved in opposite directions. In some embodiments, this two-part arrangement (at least two parts/two components) is provided on the compressing side in that on said compressing side the bolt 16 functions as a first part (first component, axle-remote component) and the pressure bracket 14 that is combined with the bolt 16 functions as a second part (second component, axle-near component). The illustration in FIG. 3 illustrates these two components (pressure bracket 14, bolt 16) of the axle receiving arrangement 10 individually, in other words without the rest of the components of the axle receiving arrangement 10 and in the state detached from one another.

The following description is continued on the basis of the illustrated embodiment and the two-part arrangement in said embodiment on the compressing side. In this case, it is always to be understood that the two-part arrangement (at least two parts) that is provided on the compressing side in the case of the illustrated embodiment can also be provided alternatively or in addition on the tensioning side. In this respect, specifically in the case of each mention of a pressure bracket 14 (axle-near component) and a bolt 16 (axle-remote component) a corresponding two part arrangement on the tensioning side is to be understood below, for example in the form of an essentially O-shaped tensioning frame as an axle-remote component and a tensioning frame inner part (two parts) that can be combined with the tensioning frame and that forms the tensioning-side contact surface and that accordingly functions as the axle-near component in lieu of a single-piece tension bracket 12.

The components that can move with one another in the same direction (axle-near and axle-remote component) of the axle receiving arrangement 10—in the case of the illustrated embodiment the pressure bracket 14 and the bolt 16—can be connected to one another in a detachable manner and in the useable state of the axle receiving arrangement 10 are connected to one another in a detachable manner.

In the case of the illustrated embodiment, the pressure bracket 14 (axle-near component) is attached to the bolt 16 (axle-remote component) in a detachable manner and in the state in which said pressure bracket and bolt are inserted into the housing 20, said pressure bracket is also held in the attached position on the bolt 16 by means of the housing 20. For this purpose, in the case of the illustrated embodiment the pressure bracket 14 is embodied in a clamp-like manner, wherein the clamp-like embodiment resides in the fact that the pressure bracket 14 has arms 40 on the side and said arms connect to a center part. In the state in which the pressure bracket is attached to the bolt 16, by means of these side arms 40 the pressure bracket 14 grips around an enlarged section (bolt head) of the bolt 16 that is defined for holding the pressure bracket 14. The length of the side arms 40 and the position of their engagement on the bolt head are selected so that even in the case of a bolt 16 that is lowered to the maximum extent along the nut 18, the point of engagement does not reach into the region of the opening in the housing 20, said opening being defined for the passage of the axle 30. The pressure bracket 14 in other words cannot fall out of the housing 20 even in the case of a bolt 16 that is lowered to the maximum extent.

In order to attach to the bolt 16, the pressure bracket 14 for example is pushed with its side arms 40 in a movement direction transverse with respect to the longitudinal axis of the bolt 16 over the bolt head. In addition or alternatively, it is also possible to attach the pressure bracket 14 to the bolt 16 by latching to the bolt head. The side arms 40 of the pressure bracket and the bolt head then have corresponding contours for a latching connection (latching lug and latching lug receiving arrangement in in each case opposite-lying surfaces).

In some embodiments, an at least two-part tensioning-side and/or compressing-side embodiment has been introduced so as to reduce tensioning stresses and specifically so as to avoid a rupture of a component. In addition, it is provided that between in each case two compressing-side or tensioning-side components that are connected to one another the axle receiving arrangement 10, in other words between the respective axle-near and axle-remote component, at least in the load-free state a gap remains between mutually facing surface sections of these two components.

In the case of the illustrated embodiment, these two components are the pressure bracket 14 (axle-near component) and the bolt 16 (axle-remote component) and the pressure bracket 14 and bolt 16 are combined with one another for example in that the pressure bracket 14 is attached to the bolt 16. In the case of the illustrated embodiment, the above-mentioned gap is provided accordingly between the mutually facing surface sections of these two components. In general, this gap is provided between the respective axle-near and axle-remote component. The relevant surface of the pressure bracket 14 is the underside or inner side 42 of the pressure bracket 14 and is referred to below as the pressure bracket underside 42 (pressure bracket inner side) and the pressure bracket underside 42 comprises the surface without the inner surfaces of the side arms 40 and said surface faces the bolt 16 in the state in which the pressure bracket is attached to the bolt 16. The relevant surface of the bolt 16 is its upper side or inner side 44 and is accordingly referred to as the bolt upper side 44 (bolt inner side) and comprises the surface of the bolt 16 that faces the pressure bracket underside 42.

The terms "pressure bracket underside 42 and pressure bracket inner side" on the one hand and also "bolt upper side 44 and bolt inner side" on the other hand in each case refer to the same thing and are accordingly interchangeable. The description is however continued on the basis of the terms pressure bracket underside 42 and also bolt upper side 44.

The gap that remains at least in the load-free state between the pressure bracket underside 42 and the bolt upper side 44 is referred to below in short as gap 46 (see FIG. 2, the reference line ends at least in the region of the location of the gap 46 that is narrow in comparison to the size of the surrounding components).

In some embodiments, the pressure bracket underside 42 is curved in a convex manner and the bolt upper side 44 is curved in a concave manner. With this shape, the bolt upper side 44 receives the pressure bracket 14 with its pressure bracket underside 42 essentially in a positive-locking manner (in the case of taking into consideration the gap 46 that remains in the load-free state). Broadly speaking, the axle-near component and the axle-remote component 14, 16 have mutually facing convex and concave surfaces 42, 44, namely the axle-near component 14 has a convex underside 42 and the axle-remote component 16 has a concave upper side 44, and these two surfaces 42, 44 enclose the gap 46.

Figure 4:
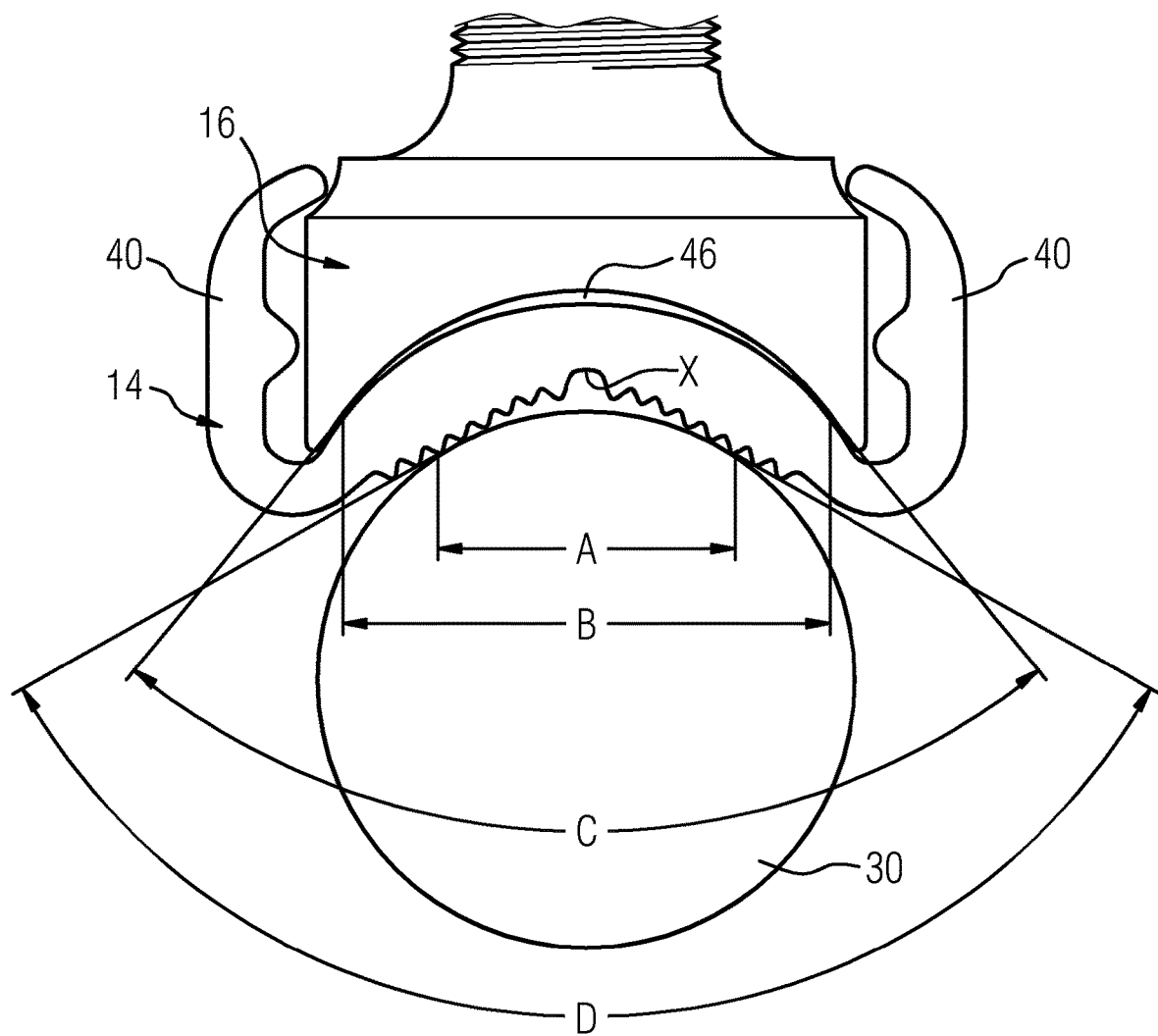
FIG. 4 shows designations for referring to individual fundamental characteristics of the bolt and pressure bracket.

In the illustration in FIG. 3—and also in the illustration in FIG. 4—it is also apparent in the schematically simplified illustration therein that the radii (at least the radii in the region of the respective apexes) of the pressure bracket underside 42 and the bolt upper side 44 are not identical.

For the sake of improved readability of the further description, a crescent-shaped pressure bracket underside 42 and a likewise crescent-shaped bolt upper side 44 is assumed. It is then possible to refer to the radii of corresponding (imaginary) full circles. A crescent-shaped pressure bracket underside 42 and a likewise crescent-shaped bolt upper side 44 however only represents a specific, nevertheless preferred, embodiment. Elliptical or parabolic contours are also taken into consideration for the pressure bracket underside 42 and the bolt upper side 44. In the case of such contours, the radii of circles that are drawn in the region of the apexes of the pressure bracket underside 42 and the bolt upper side 44 are then relevant.

In this respect, it has been stated above: "the radii (at least the radii in the region of the respective apexes)". In lieu of such a "long form" of the wording, in the case of adopting a crescent-shaped pressure bracket underside 42 and a likewise crescent-shaped bolt upper side 44 it is possible to discuss in short the respective radii (in other words the radii of the respective full circle). Because in lieu of crescent-shaped contours elliptical or parabolic contours also come into consideration, in the case of each mention of a radius, not merely the radius of the respective full circle but rather also the radius of a circle that is drawn in the region of the apex of the respective contour is also to be understood.

The radius of the pressure bracket underside 42 (at least the radius of the pressure bracket underside 42 in the region of the apex at said radius) is larger than the radius of the bolt upper side 44 (at least the radius of the bolt upper side 44 in the region of the apex at said radius). Owing to this difference between the radii, in the case of a pressure bracket 14 that is attached to the bolt 16 in the load-free state of the above-mentioned gap 46 the radius remains (see also FIG. 4). This gap 46 (in the load-free state a clear span of the gap 46) is largest in the region of the apexes, which lie opposite one another, of the pressure bracket underside 42 and the bolt upper side 44.

The illustration in FIG. 4 illustrates the pressure bracket 14 in a configuration in which said pressure bracket is attached to the bolt 16 and in contact with the section of the surface of an axle 30, namely a contact, as said pressure bracket provides in the case of fixing a complete axle receiving arrangement 10 (FIG. 2) to the axle 30. In the illustration, in order to facilitate referencing, individual characteristics that characterize an optional, embodiment of the axle receiving arrangement 10 are referred to by capital letters:

In the case of fixing an axle 30, a contact is provided between the axle surface and the pressure bracket 14, namely the axle surface on the one hand and the pressure bracket contact surface 34 on the other hand. The letter A refers to the gap between the contact sites (essentially linear contact sites having an extent transverse with respect to the drawing plane of FIG. 4 and in this direction over the entire pressure bracket contact surface 34) of the pressure bracket 14 on the axle surface and a distance between these contact sites. In the case of fixing an axle 30, a pressure loading acts on the outer points of this distance (in the axial direction of the bolt 16; transverse with respect to the center longitudinal axis of the axle 30) on the pressure bracket 14.

In the case of fixing an axle 30, a contact is provided between the pressure bracket underside 42 (FIG. 3) and the bolt upper side 44 (FIG. 3). The letter B refers to the gap between in each case an inner end of the contact sites of the pressure bracket underside 42 and the bolt upper side 44 and a distance between these contact sites. The contact sites reach from the outer end of the bolt upper side 44 to a region that lies further inward on the bolt upper side 44 in comparison with said outer end. Here in other words, a planar contact site is provided (this contact site also extends transverse with respect to the drawing plane of FIG. 4 and in this direction over the entire bolt upper side 44). In the case of fixing an axle 30, a tensioning stress acts along this distance and in the two directions of the double arrow onto the bolt 16 in the region of the bolt head on said bolt. Moreover, in the case of fixing an axle 30 on the outer points of this distance a pressure loading acts on the bolt head (in the axial direction of the bolt 16). Here in the case of fixing an axle 30, the pressure loading that is introduced at the contact sites of the pressure bracket 14 on the axle surface into the pressure bracket 14 is passed onto the bolt head.

The letter C refers to the opening width of an angle between two imaginary tangents that are applied in the region of the edge points of the pressure bracket underside 42 onto the pressure bracket underside 42.

The letter D refers to the opening width of an angle between two imaginary tangents that follow the V-shaped contour of the pressure bracket contact surface 34 (FIG. 2).

According to the approach proposed here, the length of the distance B (the gap between the inner ends of the contact sites between the pressure bracket underside 42 and the bolt upper side 44) is always greater than the length of the distance A (the gap between the contact sites between the pressure bracket 14 and the axle surface): B>A.

In the case of fixing an axle 30, this length ratio leads to an elastic deformation of the pressure bracket 14, which reduces the width of the gap 46. In other words, the pressure bracket 14 is deformed in an elastic manner in the case of fixing an axle 30 with its pressure bracket underside 42 in the direction of the bolt upper side 44. This leads to a tensioning stress in the pressure bracket 14 and said tensioning stress is distributed along the pressure bracket underside 42 (owing to the comparatively large radius of the pressure bracket underside 42, the distribution of the tensioning stress is provided on a comparatively large surface and there is no concentration of the tensioning stress in a tightly limited region). The elastic deformation simultaneously causes a compression stress in the pressure bracket 14 along the pressure bracket contact surface 34 that can be imagined as concentrated in the region of the pressure bracket 14, which is referred to by the letter X.

Insofar as linear contact sites are assumed in relation to the edge points of the distance A and the contact sites that are located on said edge points between the pressure bracket 14 and the axle surface, this refers to a situation in which in the case of a toothed/ribbed surface of the pressure bracket contact surface 34 on both sides in each case a rib lies against the axle surface. This is an idealized approach and in practice it is entirely possible to provide a supporting arrangement of multiple in each case adjacent ribs on the axle surface. In each case, the outer contact sites are then relevant with regard to the gap between the contact sites between the pressure bracket 14 and the axle surface. In this respect, the letter A then refers to the gap between the outer contact sites of the pressure bracket 14 on the axle surface and the distance between these outer contact sites. The description is however continued on the basis of the idealized approach and simple, linear contact sites.

In addition or as an alternative to a shaping that leads to the above-described length ratio (B>A), according to the approach proposed here, the angle C (angle owing to the geometry of the pressure bracket underside 42) is always smaller than the angle D (angle owing to the geometry of the pressure bracket contact surface 34): C<D. The angle C for example lies in the region of 80°, for example in a range of 80°±40°, in particular in a range of 80°±10°. The angle D for example lies in the region of 120°. This has proven to be practical for fixing different axle diameters.

This length ratio (B>A) and/or this angle ratio (C<D) leads in a comparatively simple manner to the fact that a fixing of an axle 30 leads to an elastic deformation (as described above) of the pressure bracket 14. The tensioning stress that results on account of the deformation in the pressure bracket 14 is distributed onto the pressure bracket underside 42, namely onto the section of the pressure bracket underside 42 between the edge points of the distance that is referred to by the letter B. Owing to this distribution of the tensioning stress in the pressure bracket 14 along from the pressure bracket underside 42 of said pressure bracket, said tensioning stress is lower at each location than the loading limit.

In summary: in the case of fixing an axle 30, a pressure loading is provided on the pressure bracket contact surface 34 on the end points of the distance that is referred to by the letter A (the axle surface lies against the pressure bracket contact surface 34 at said distance). Owing to the elastic deformation of the pressure bracket 14 that results in the case of fixing the axle 30, a compression stress is provided in the pressure bracket 14 and said compression stress is concentrated in the region of the point that is referred to by the letter X. In the case of fixing an axle 30, moreover a tensioning stress that is distributed between the end points of the distance that is referred to by the letter B is provided in the pressure bracket 14 in the region of the pressure bracket underside 42 of said pressure bracket and along the pressure bracket underside 42; the tensioning stress is distributed onto the part of the surface of the pressure bracket underside 42, which is enclosed by the end points of the distance that is referred to by the letter B.

In the case of fixing an axle 30 without the gap 46 and the above-described elastic deformation, a maximum tensioning stress would act on the region of the pressure bracket 14 that is referred to by the letter X. At this point, it is possible to imagine the compressing stress that results owing to the elastic deformation as concentrated at this point. A compression stress is if anything not critical for a sintering part as is the case in the pressure bracket 14. The tensioning stress acts on the pressure bracket underside 42 and exceeding load limits is if anything not a cause of concern in normal application scenarios owing to the comparatively extensive distribution of the tensioning stress.

Without a gap 46 or without a gap 46 and also without the specific shaping of the pressure bracket underside 42 and the bolt upper side 44 (convex or concave; C<D) in the case of fixing an axle 30 a tensioning stress would result on the two sides of the V-shaped pressure bracket contact surface 34 in an in each case different direction and in the event of exceeding a load upper limit said tensioning stress leads to a rupture of the pressure bracket 14 in the region where the two limbs of the V-shaped pressure bracket contact surface 34 meet (FIG. 4: point X).

Figure 5:
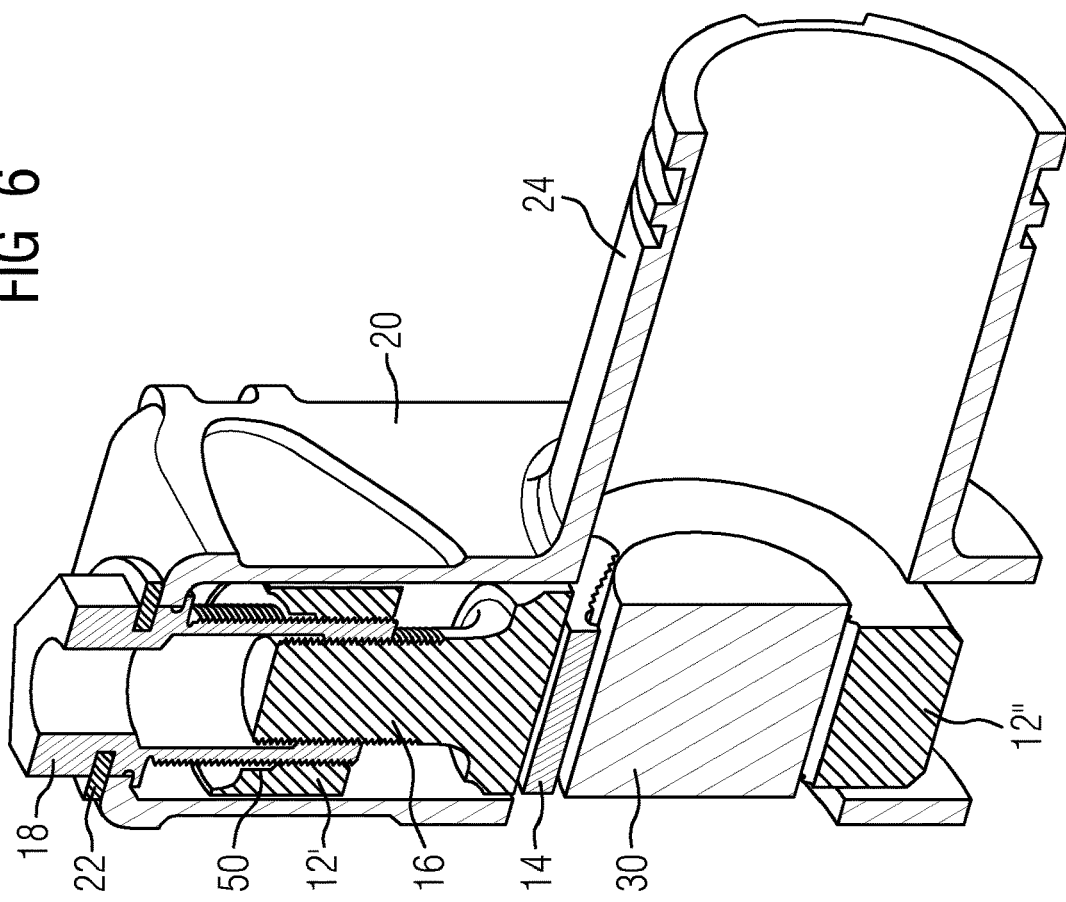
FIGS. 5-6 show the axle receiving arrangement from FIG. 1 with the sectional plane as in FIG. 2 or a further sectional plane.
Figure 6:
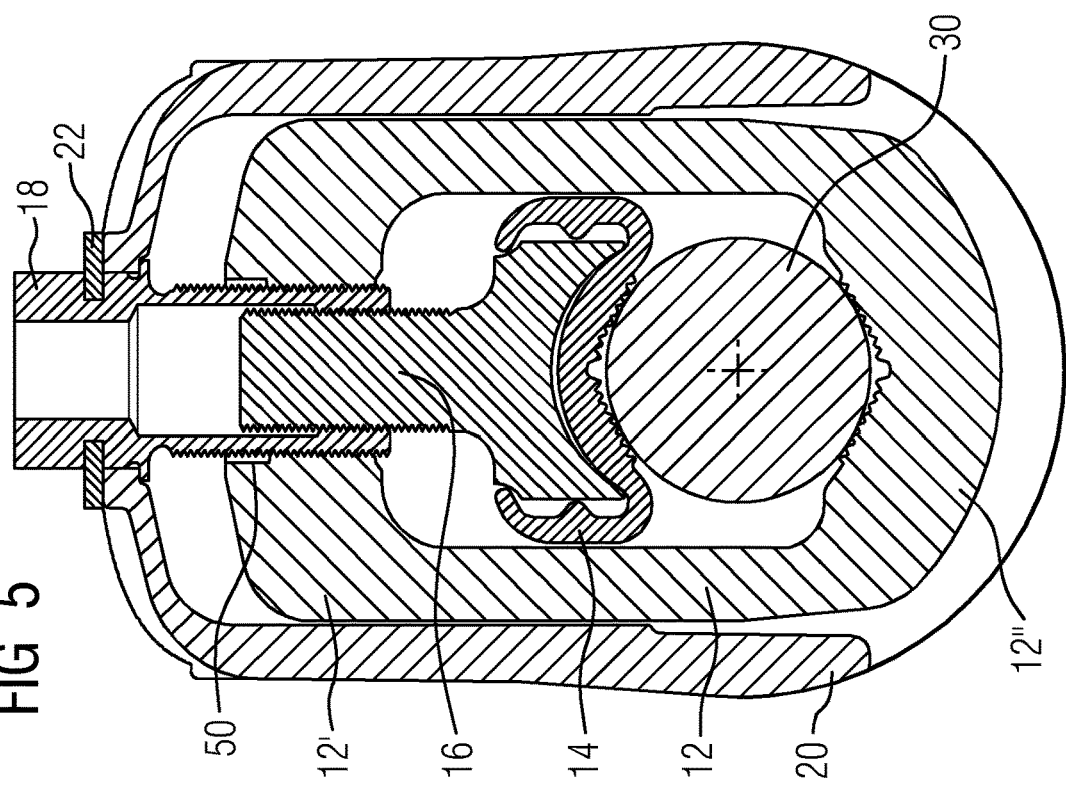

The illustrations in FIG. 5 and in FIG. 6 illustrate the axle receiving arrangement 10 in accordance with FIG. 1 in two sectional views that are placed adjacent to one another. The axle receiving arrangement 10 in the illustration in FIG. 5 is illustrated with a sectional plane (first sectional plane) as in FIG. 2. The axle receiving arrangement 10 in the illustration in FIG. 6 is illustrated with a further sectional plane. This further sectional plane is perpendicular to the first sectional plane in the case of the inclusion of a longitudinal axis of the bolt 16 (or a longitudinal axis of the nut 18).

Figure 7:
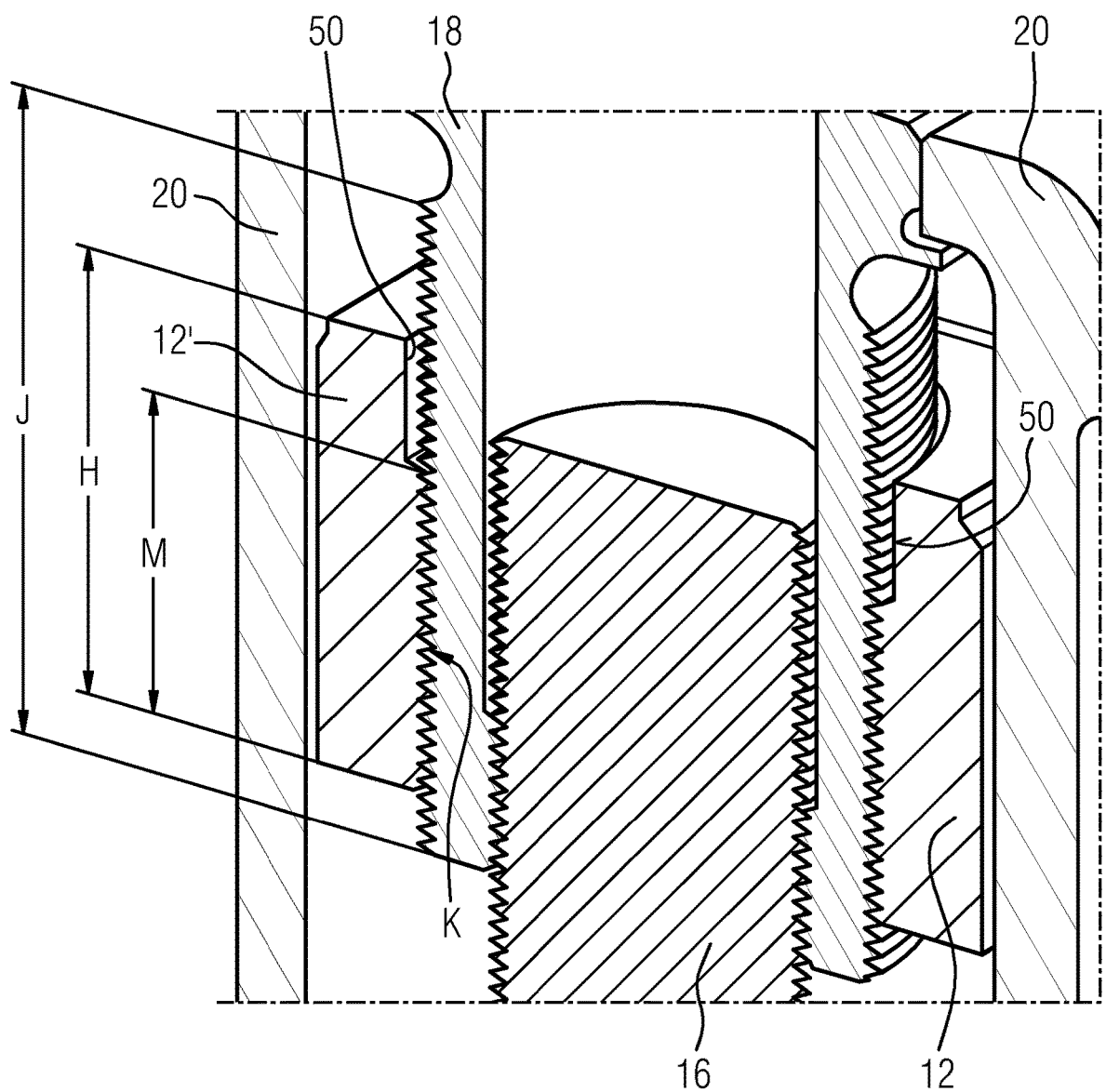
FIG. 7 shows an enlargement of the sectional view having the further sectional plane in FIG. 6.

The illustration in FIG. 7 illustrates an enlarged section from the sectional view in FIG. 6 and in FIG. 7 a particular, nevertheless fundamentally optional, aspect of the axle receiving arrangement 10, namely a circumferential annular gap 50. The section comprises the regions having the outer thread and inner thread of the nut 18 and the corresponding thread sections of the tension bracket 12 (of the tension bracket upper part 12') on the one hand and the bolt 16 on the other hand. These thread sections are in engagement with the outer thread or inner thread of the nut 18.

Different dimensions are marked out by means of the side dimensioning arrows in this region. A height of the tension bracket upper part 12' (gap between an underside and an upper side of the tension bracket upper part 12'; tension bracket upper part height) is referred to by the letter H. A length (height) of the shaft section of the nut 18, which is provided with the outer thread, is referred to by the letter J. A contact region between the tension bracket upper part 12' and the nut 18, in other words a region in which the tension bracket thread and the outer thread of the nut are in engagement with one another, is referred to in the illustration in FIG. 7 by the letter K.

The tension bracket thread (inner thread in the tension bracket upper part 12') and thereby the above-mentioned contact region K having the outer thread of the nut 18 start on the side of the tension bracket upper part 12' on the underside of the tension bracket upper part 12' and terminate below the upper side of the tension bracket upper part 12'. A height of this contact region K along the shaft section of the nut 18 is referred to by the letter M.

The contact region K extends to a certain extent in the axial direction of the nut 18; this is in other words a cylinder barrel-shaped positive locking connection (cylinder barrel-shaped thread contact). The height M of this contact region K is smaller than the tension bracket upper part height H (M<H). Owing to this height difference, the circumferential annular gap 50 remains on the upper side of the tension bracket upper part 12' that faces the positive-locking element of the nut 18 (see also FIG. 2).

Figure 8:
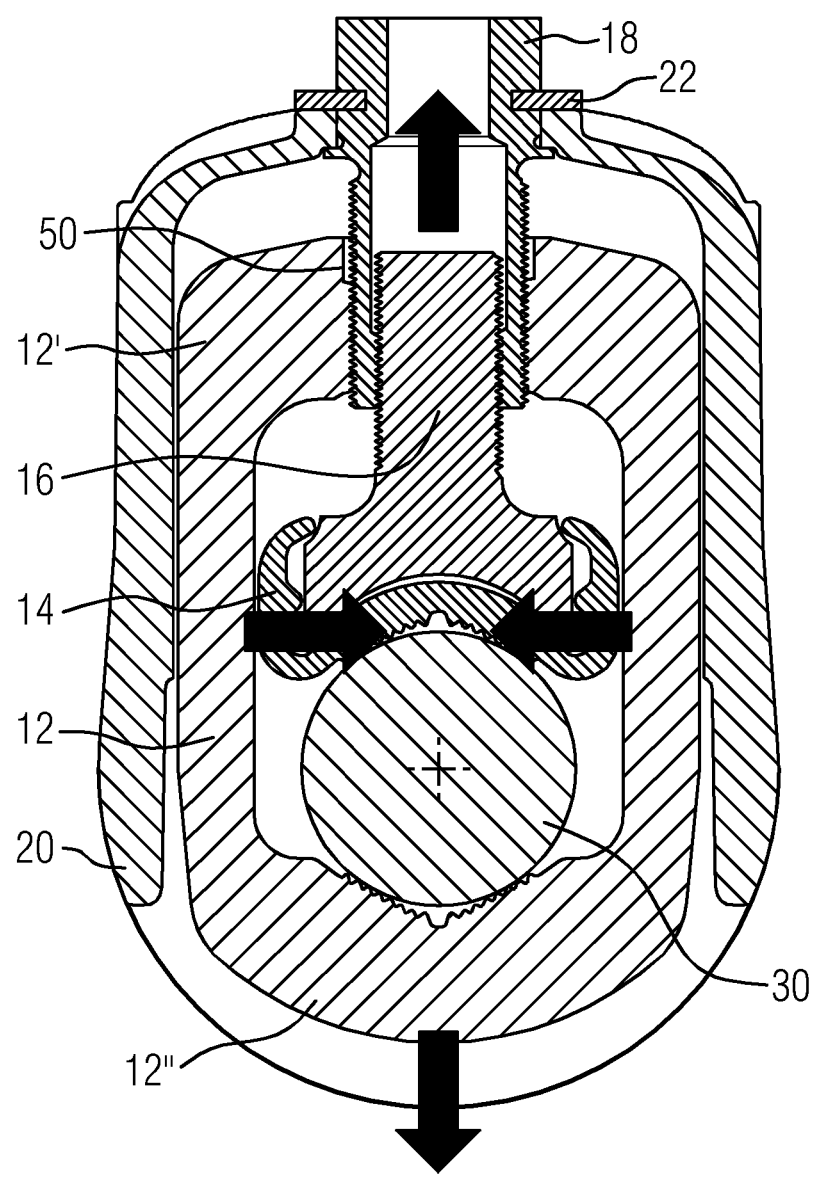
FIGS. 8-9 show a further component of the axle receiving arrangement from FIG. 1, namely a pressure bracket.

In the case of fixing an axle 30, different loads act on the tension bracket 12 and specifically the tension bracket upper part 12'. Fundamental deformation directions of the tension bracket 12 that result in the case of fixing an axle 30 are illustrated in the illustration in FIG. 8 by means of the block arrows in the figure. Owing to these deformation directions, an outwardly oriented stress is provided in the tension bracket upper part 12' starting from the threaded hole on both sides in the region of the upper end of the annular gap 50. In the case of pressure brackets 12 without an annular gap 50, this has occasionally led to a crack in the tension bracket upper part 12' in the event of exceeding a load upper limit. Such a crack starts from the outward facing surface of the tension bracket upper part 12' and extends in the direction of the threaded hole in the tension bracket upper part 12'.

Owing to the annular gap 50, the location of the stress that results owing to the above-described deformation in the tension bracket upper part 12' is separated from a location of further stresses in the tension bracket upper part 12', namely stresses that result in the case of fixing an axle 30 owing to the thread connection between the tension bracket 12 and bolt 16. Without the annular gap 50, these stresses would be concentrated on a tightly limited region, namely in the region of the outward facing surface of the tension bracket upper part 12'. The annular gap 50 avoids such a concentration.

Owing to the concentration, which is avoided by means of the annular gap 50, of the stresses that act on a tightly limited region of the tension bracket upper part 12' in the case of fixing an axle 30, it is possible to produce the tension bracket 12 from a comparatively affordable material and this material is for example a sintering material. Parts that are produced from a sintering material are not merely comparatively cost-effective but rather also render possible comparatively complex contours and/or surface structures.

In the case of a tension bracket 12 that is produced from a sintering material, it is possible for example for the surface structures in the region of the essentially V-shaped contact surface 32 to be directly introduced with the production of the tension bracket 12 into the surface of said tension bracket in the region of the tension bracket underside 12". Furthermore, the production of the tension bracket 12 from a sintering material also renders it possible to focus on an ability of the housing 20 to withstand intense loading and/or an ability of the tension bracket 12 itself to withstand intense loading.

With regard to the greater ability of the housing 20 to withstand intense loading, it is provided that the tension bracket 12 has a circumferential beveling 52 (oblique surface or radius during the transition from the large surface to the adjoining side surface) or circumferential beveling 52 (surface transverse with respect to the longitudinal axis of an axle 30 that is fixed by means of the axle receiving arrangement 10) in at least one large surface, in particular in two large surfaces. This/these circumferential beveling(s) 52 renders or render possible a material thickening in the housing 20 that functions as a corner reinforcement. Without such a corner reinforcement, on account of the beveling(s) 52 between the housing 20 and the tension bracket 12 that is introduced into the housing 20 an intermediate space remains that is enclosed by the respective beveling 52 and the housing section that lies opposite. The above-mentioned corner reinforcement in the housing 20 precisely or at least essentially occupies this intermediate space. The housing 20 also receives the tension bracket 12 in the region of the beveling(s) 52 in a positive-locking manner using the corner reinforcement. The corner reinforcement is located in regions in which in each case two wall sections of the housing 20 abut one another. A corner reinforcement in this region reinforces the housing 20 at such sites that are otherwise at a comparatively intense risk of rupture.

With regard to the greater ability of the tension bracket 12 to withstand intense loading, it is provided that this tension bracket has a material thickening 54 in the region of the tension bracket upper part 12' and the tension bracket thread at that location, and below said material thickening is referred to for the sake of differentiation as the tension bracket thickening 54. The tension bracket thickening 54 is connected as one piece to the tension bracket 12 and reinforces the edge around the hole having the tension bracket thread and in particular compensates material loss in this region that results owing to the annular gap 50.

Figure 9:
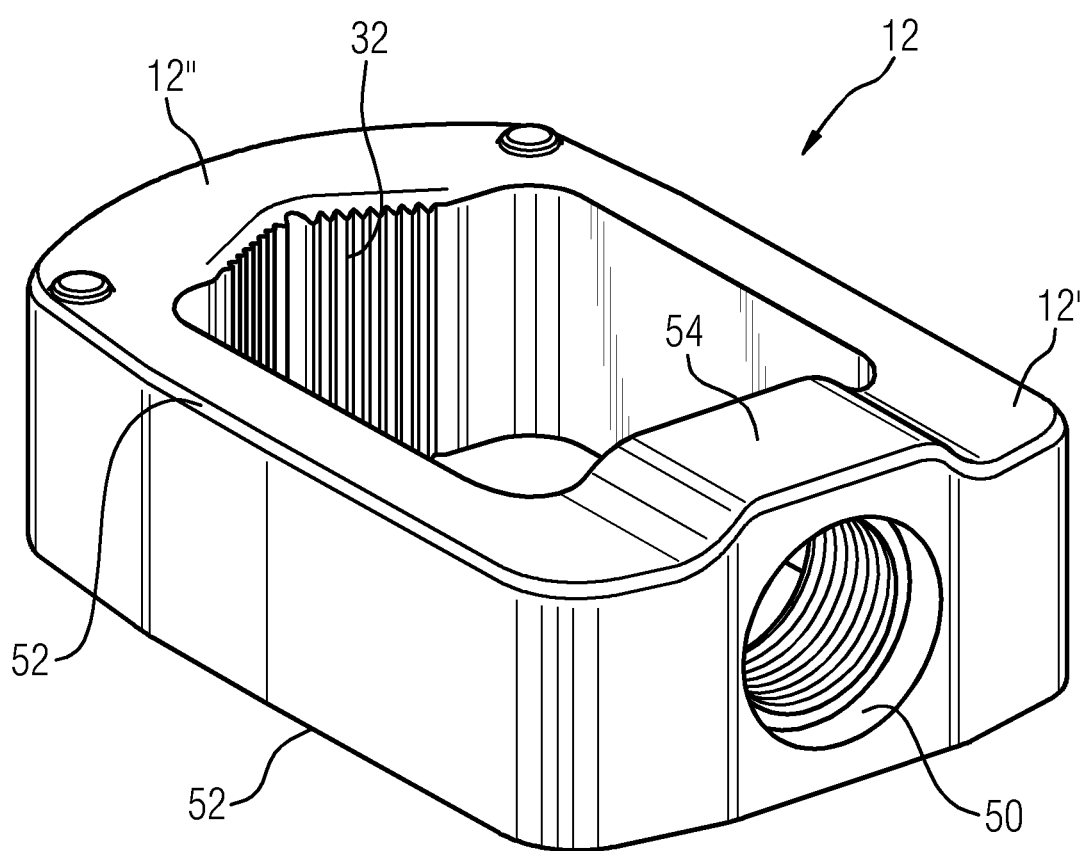

The illustration in FIG. 9 illustrates the tension bracket 12 having side beveling 52 and the tension bracket thickening 54. The housing 20 has a bulge 20' in order to receive the tension bracket 12 having the tension bracket thickening 54 (FIG. 2).

Although the teachings of the present disclosure have been illustrated and described in detail by the exemplary embodiment, the scope of the disclosure is not limited in this manner by the one or multiple disclosed examples and other variations can be derived therefrom by the person skilled in the art without departing from the protective scope thereof.

Individual significant aspects of the description that is submitted here can therefore be summarized in short as follows: disclosed are an axle receiving arrangement 10 for an air vent rotary drive and an air vent rotary drive having such an axle receiving arrangement 10. The axle receiving arrangement 10 comprises components 12, 14, 16 that can move in opposite directions and in each case move in the direction of an axle 30 that is received by the axle receiving arrangement 10. These components are part of a tensioning side or compressing side of the axle receiving arrangement 10. The axle receiving arrangement 10 has at least two components 14, 16 that can be combined with one another on the tensioning side and/or on the compressing side and one of said components—the axle-near component—is in contact with the axle surface in the case of fixing the axle receiving arrangement 10 to the axle 30 and said axle-near component participates in a positive-locking and non-positive locking fixing of the axle 30 by means of the axle receiving arrangement 10 and the other of said components—the axle-remote component—ensures the movability in the direction of an axle 30 that is received by the axle receiving arrangement 10, wherein the tensioning-side or compressing-side components 14, 16 that can be combined with one another, in other words the axle-near and the axle-remote component, in the combined state enclose a gap 46, namely a gap 46 between on the one hand convex and on the other hand concave curved surfaces.

LIST OF REFERENCE CHARACTERS

10 Axle receiving arrangement
12 Tension bracket
12' Tension bracket upper part
12" Tension bracket lower part
14 Pressure bracket
16 Bolt
18 Nut
20 Housing
20' Bulge
22 Snap ring
24 Cylindrical extension (on the housing)
30 Axle
32 Contact surface, tension bracket contact surface
34 Contact surface, pressure bracket contact surface
40 (side) arm (on the pressure bracket)
42 Underside, pressure bracket underside
44 Upper side, bolt upper side
46 Gap
50 Annular gap
52 Beveling
54 Tension bracket thickening
A Gap between contact sites of the pressure bracket and the axle surface
B Gap between an inner end of the contact sites of the pressure bracket underside and the bolt upper side
C Opening width of an angle between two tangents that are applied to the pressure bracket underside
D Opening width of an angle between two of the tangents that follow the contour of the pressure bracket contact surface
H Height of the tension bracket upper part
J Length of the outer thread on the nut
K Contact region between the tension bracket upper part and nut
M Height of the contact region K

What is claimed is:

1. An axle receiving arrangement for fixing to an axle, the arrangement comprising:
multiple components movable in opposite directions with respect to an axle received by the axle receiving arrangement;
wherein the multiple components are part of either a tensioning side or a compressing side of the axle receiving arrangement;
wherein for at least two of the multiple components in the case of fixing the axle receiving arrangement to the axle, one of the at least two components participates in a positive-locking and non-positive locking fixing of the axle by the axle receiving arrangement and the other of said components ensures the movability in the direction of the axle; and
wherein the multiple components enclose a gap in their combined state;
wherein the multiple components comprise: a tension bracket, a pressure bracket, a bolt, a nut, and a housing;
wherein the tension bracket, pressure bracket, bolt, and nut are inserted into the housing in a configuration in which said tension bracket, pressure bracket, bolt, and nut are combined with one another and are fixed in the housing;
wherein the pressure bracket and the bolt function as compressing-side components that can be combined with one another and that in the combined state enclose the gap; and
wherein the pressure bracket includes a pressure bracket contact surface against a surface of the axle;
the bolt has a concave bolt upper side and the pressure bracket has a convex pressure bracket underside;
the bolt with its concave bolt upper side receives the pressure bracket with its convex pressure bracket underside; and
the gap remains between the bolt upper side and the pressure bracket underside and in the combined state said gap is enclosed by the pressure bracket and the bolt.

2. The axle receiving arrangement as claimed in claim 1 and having a V-shaped pressure bracket contact surface, wherein:
   on the one hand contact sites of the V-shaped pressure bracket contact surface result on the axle surface and also on the other hand contact sites result between the convex pressure bracket underside and the concave bolt upper side; and
   a first gap between the contact sites on the pressure bracket contact surface is smaller than a second gap between in each case an inner end of the contact sites of the pressure bracket underside and the bolt upper side.

3. The axle receiving arrangement as claimed in claim 2, wherein a first opening width of an angle between two tangents that are applied in the region of the edge points of the pressure bracket underside is smaller than a second opening width of an angle between two tangents that follow the V-shaped pressure bracket contact surface.

4. The axle receiving arrangement as claimed in claim 1, wherein the tension bracket is a movable component on the tensioning side;
   wherein for the movability of the tension bracket a thread of the tension bracket is in engagement with a thread of the nut;
   wherein the tension bracket has the thread in a tension bracket upper part and the thread starts in said tension bracket upper part on an underside of the tension bracket upper part and terminates below an upper side of the tension bracket upper part; and
   wherein owing to the thread that terminates below the upper side of the tension bracket upper part a circumferential annular gap remains on the upper side of the tension bracket upper part.

5. An air vent rotary drive comprising an axle receiving arrangement including:
   a drive facility with an axle;
   multiple components movable in opposite directions with respect to the axle received by the axle receiving arrangement;
   wherein the multiple components are part of either a tensioning side or a compressing side of the axle receiving arrangement;
   wherein at least two of the multiple components in the case of fixing the axle receiving arrangement to the axle, one of the at least two components participates in a positive-locking and non-positive locking fixing of the axle by the axle receiving arrangement and the other of said components ensures the movability in the direction of the axle; and
   the multiple components enclose a gap in their combined state;
   the respective components enclosing the gap have mutually facing convex and concave surfaces, wherein one of the components has a convex underside and the other component has a concave upper side; and
   the component lying against a surface of the axle has the convex underside;
   the component lying against the surface of the axle has a V-shaped contact surface; and
   on the one hand contact sites of the V-shaped contact surface result on the axle surface and also on the other hand contact sites result between the convex underside of the component that lies against the axle surface and the concave upper side of the other component; and
   a first gap between the contact sites on the V-shaped contact surface is smaller than a second gap between an inner end of the contact sites of the mutually facing convex and concave surfaces.

6. An axle receiving arrangement for fixing to an axle, the arrangement comprising:
   multiple components movable in opposite directions with respect to an axle received by the axle receiving arrangement;
   wherein the multiple components are part of either a tensioning side or a compressing side of the axle receiving arrangement;
   wherein for at least two of the multiple components in the case of fixing the axle receiving arrangement to the axle, one of the at least two components participates in a positive-locking and non-positive locking fixing of the axle by the axle receiving arrangement and the other of said components ensures the movability in the direction of the axle;
   the multiple components enclose a gap in their combined state;
   the respective components enclosing the gap have mutually facing convex and concave surfaces, wherein one of the components has a convex underside and the other component has a concave upper side; and
   the component lying against a surface of the axle has the convex underside;
   the component lying against the surface of the axle has a V-shaped contact surface; and
   on the one hand contact sites of the V-shaped contact surface result on the axle surface and also on the other hand contact sites result between the convex underside of the component that lies against the axle surface and the concave upper side of the other component; and
   a first gap between the contact sites on the V-shaped contact surface is smaller than a second gap between an inner end of the contact sites of the mutually facing convex and concave surfaces.

7. The axle receiving arrangement as claimed in claim 6, wherein an opening width of an angle between two tangents applied in the region of the edge points of the convex underside of the component lying against the axle surface is smaller than an opening width of an angle between two tangents that follow the V-shaped contact surface.

* * * * *